United States Patent [19]

Ham

[11] Patent Number: 5,561,822
[45] Date of Patent: Oct. 1, 1996

[54] SYSTEM STATUS MAINTAINING AND SUPPORTING APPARATUS SHARING ONE CONSOLE WITH A CPU

[75] Inventor: Dae-ho Ham, Suwon, Rep. of Korea

[73] Assignee: Samsung Electronics Co., Ltd., Kunggi-do, Rep. of Korea

[21] Appl. No.: 347,207

[22] Filed: Nov. 22, 1994

Related U.S. Application Data

[63] Continuation of Ser. No. 906,352, Jun. 30, 1992, abandoned.

[30] Foreign Application Priority Data

Nov. 27, 1991 [KR] Rep. of Korea ..................... 91-21450

[51] Int. Cl.⁶ ..................................................... G06F 13/00
[52] U.S. Cl. ......................... 395/856; 395/835; 395/311; 364/238.2
[58] Field of Search ..................................... 395/275, 325, 395/821, 835, 856, 857, 858, 311, 200.2, 200.02; 364/238.2

[56] References Cited

U.S. PATENT DOCUMENTS

| | | | |
|---|---|---|---|
| 3,573,740 | 4/1971 | Berger et al. | 379/10 |
| 3,908,099 | 9/1975 | Borbas et al. | 395/275 |
| 4,125,872 | 11/1978 | Maxwell | 364/900 |
| 4,866,667 | 9/1989 | Shimada | 395/325 |
| 5,243,174 | 9/1993 | Veeneman et al. | 235/381 |
| 5,272,465 | 12/1993 | Meares, Jr. | 340/539 |
| 5,280,586 | 1/1994 | Kunz et al. | 395/275 |

*Primary Examiner*—Christopher B. Shin
*Attorney, Agent, or Firm*—Leydig, Voit & Mayer

[57] ABSTRACT

A system status maintaining and supporting apparatus in which more than two boards can be utilized with one console for communication, capable of monitoring the system status without system bus utilization. A system maintenance and support processor board is provided with different ports for console, CPU board and modem connections, and includes a selective switching circuit for selectively connecting ports in accordance with control signals based on predetermined modes. In the system maintenance and support mode, data processed in the system maintenance and support processor board is supplied to the console via a serial input/output controller, data obtained from the CPU board is transmitted to the console in a mode used for central process unit only, and upon a remote maintenance and support mode, the modem is selectively connected to the CPU and system maintenance and support processor boards.

15 Claims, 6 Drawing Sheets

SYSTEM STATUS MAINTAINING AND SUPPORTING APPARATUS SHARING ONE CONSOLE WITH A CPU

This application is a continuation of application Ser. No. 07/906,352, filed Jun. 30, 1992, abandoned.

BACKGROUND OF THE INVENTION

The present invention relates to a computer system, and more particularly to a system status maintaining and supporting apparatus in which one console is commonly connected to a central processing unit (CPU) board and a system status maintenance and support processor (MSP) board. Moreover, this system status maintaining and supporting apparatus is capable of monitoring a system status in a remotely controlled section by the use of the input/output port of the MSP board without system bus utilization.

A common objective of system status maintaining and supporting apparatus is to let a user know what has happened in the computer system, by periodically supervising the power source or operating state of the computer system, thereby enabling a user to take the appropriate measures for computer system faults. The system status maintaining and supporting apparatus includes an MSP board, a monitor for the MSP board, a CPU board for controlling the whole computer system, and a console connected to the CPU board.

Here, the console is a cathode ray tube terminal used to check the system status or to manage different duties by the supervisor of the computer system. In addition to having a similar configuration as a general terminal, the console performs many specific functions resulting from the direct connection to the CPU. For the most part, it is placed adjacent to the main body of a computer.

FIG. 1 shows the hardware structure of a general computer system.

With the basic elements of a CPU, a memory device, and an input/output (I/O) device, the general computer system consists of an MSP board, a file I/O processor board, a small computer system interface (hereinafter referred to as an "SCSI") bus, a versa module Europe (VME) bus, an SCSI host adapter board acting as an interface between the SCSI bus and the VME bus, and so on, as shown in FIG. 1.

In such a computer system, there has been a necessity for the proposed standard of a common bus for interboard-connection in order to have moduled function that is the result of module division of a plurality of functions. A typical bus meeting international approval is the VME bus, wherein the term "versa" used in versa module Europe bus, designates the developed bus for Motorola's MC68000 processor. Also, the reference to "Europe" signifies that the board size for the VME bus follows the Eurocard format (the stipulated rules of IEC and DIN standards). Additionally, a VSB bus is the abbreviation for a VME-sub bus. The VSB bus utilization results in the removal of heavy traffic on the global bus and total throughput enhancement, i.e., it is employed in a local sub system, as a secondary bus.

The SCSI bus plays the role of interconnection between a peripheral device such as a hard disc controller HDC, a cartridge controller CTC and a magnetic tape driver MTD and the like, while an SCSI host adapter board acts as an interface between SCSI bus and the VME bus.

All functional boards except an interboard-connection bus include a CPU provided for controlling the overall system and arithmetic operation, a console connected to the CPU, a main memory device, a cache memory (not shown) which is a high speed memory (positioned between the CPU and the main memory device), an interface board connected to a printer and a modem, an MSP processor connected to a diagnostic terminal, a file I/O processor board, a memory device, a memory device controller, and an SCSI host adapter board functioning as an interface between the SCSI bus and the VME bus.

In order to let a user know what has happened in the computer system by periodically supervising the computer system's power source or operating status for the purpose of enhancing the computer system's reliability, the system status maintaining and supporting apparatus consists of an MSP board 40, a system status maintaining and supporting monitor 20 connected to MSP board 40, a CPU board 30 for controlling the whole computer system, and a console 10 connected to CPU board 30, as shown in FIG. 2A.

This configuration has given rise to such problems as higher cost and increased space, because two terminals are used for monitoring the system status.

As shown in FIG. 2B, another maintaining and supporting apparatus employs only one console to monitor the system. When a certain fault is sensed in MSP board 40, data to be output to console 10 is temporarily stored in a predetermined area of a memory device board 50 via the VME bus. Thereafter, CPU 30 recognizes an interrupt generation and in turn reads out the stored contents of memory device board 50, thereby displaying it on console 10. In order to precisely diagnose the computer system, a console port connected to CPU board 30 must be utilized by being moved to MSP board 40 when MSP board 40 is operating, and thus it is impossible to use CPU board 30. The use of one console causes CPU board 30 to process a lot of information whenever a certain fault occurs in the computer system, resulting in lowering the overall computer system's performance.

Consequently, the two above-mentioned apparatuses have a problem in which the VME bus 100 must be utilized to remotely monitor the computer system.

SUMMARY OF THE INVENTION

It is an object of the present invention to provide a system status maintaining and supporting apparatus in which two or more boards can mutually communicate using one console.

It is another object of the present invention to provide a system status maintaining and supporting apparatus capable of monitoring the system status without utilizing the system bus in a remotely controlling section.

To accomplish these and other objects, there is provided a system status maintaining and supporting apparatus having one console and a central processing unit for monitoring and displaying system status which shares one console with the central processing unit, comprising:

selection control means including a first port connected to the central processing unit; a second port connected to the console; and a third port connected to a modem used for communicating with a remotely controlling section, which, in accordance with a user-inputting control command, supplies a signal relating to system status to the console via the second port when the system status maintaining and supporting apparatus is in a system status maintenance and support mode, receives and/or transmits data via the first and second ports between the central processing unit and the console when the apparatus is in a mode used for the only central processing unit, and selectively connects the modem to the central processing unit and the system status maintaining and supporting apparatus when the apparatus is in a receiving/transmitting mode communicating with the remotely controlling section.

DETAILED DESCRIPTION OF THE INVENTION

Figure 3:
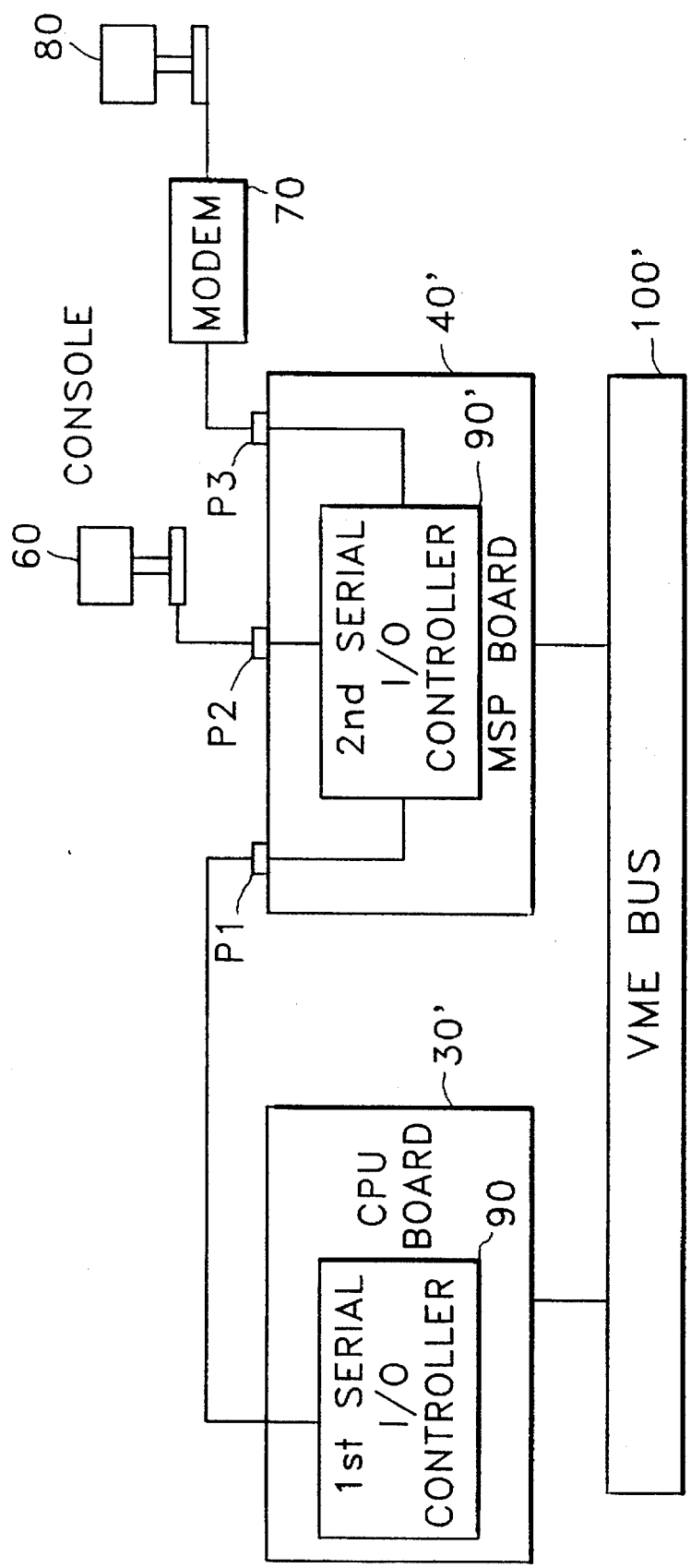
FIG. 3 is a block diagram of an embodiment of a system status maintaining and supporting apparatus sharing one console with a CPU according to the present invention.

FIG. 3 shows an embodiment of a system status maintaining and supporting apparatus sharing one console with a CPU according to the present invention.

Referring to FIG. 3, a CPU board 30' for controlling the whole computer system and an MSP board 40' are coupled via a VME bus 100'. CPU board 30' has a first internal serial I/O controller 90, while MSP board 40' has a second internal serial I/O controller 90' which is connected to each of first, second and third ports P1, P2 and P3.

First port P1 of MSP board 40' is connected to first serial I/O controller 90 of CPU board 30'. Console 60 is coupled to second port P2. A modem 70 for remotely monitoring is connected to third port P3 and a terminal 80 for displaying a modem status.

Figure 1:
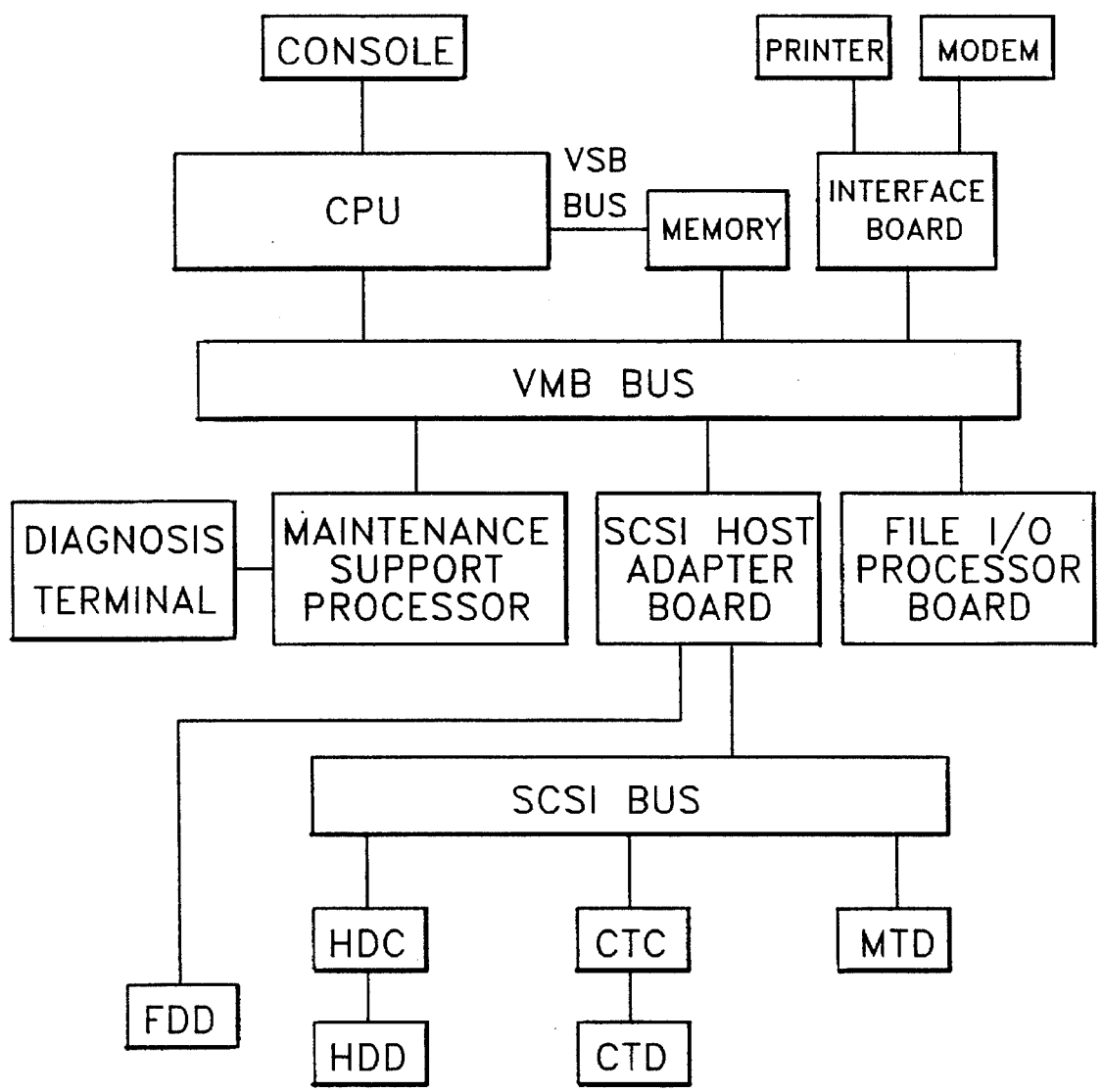
FIG. 1 shows a diagrammatic hardware structure of a general computer system.
Figure 2A:
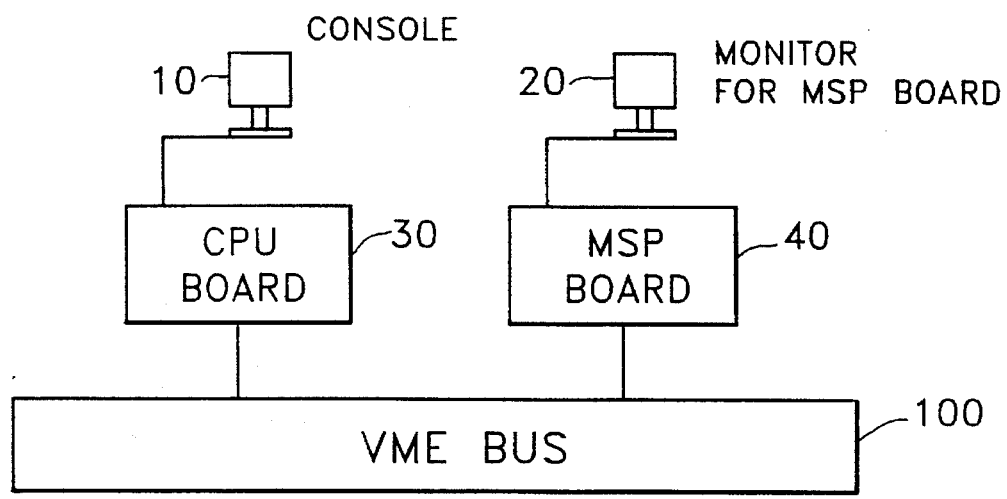
FIGS. 2A and 2B are block diagrams showing conventional system status maintaining and supporting apparatuses for a computer system.
Figure 2B:
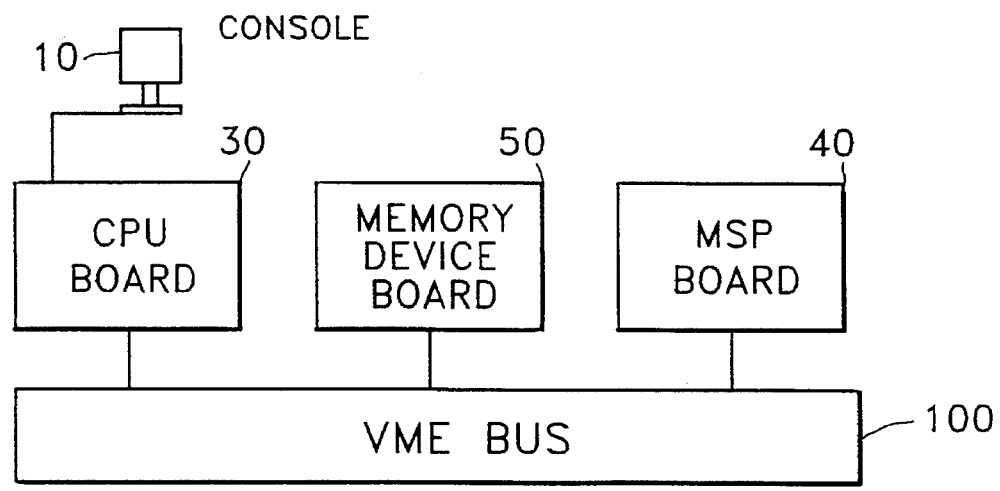

Compared with the conventional configuration of FIGS. 2A and 2B, the system status maintaining and supporting apparatus according to the present invention shown in FIG. 3 can replace console 10 and system maintainable and supportable monitor 20 of FIG. 2A with one console 60, and as shown in FIG. 3, information can be directly communicated between MSP board 40' and CPU board 30' without using VME bus 100.

Figure 4:
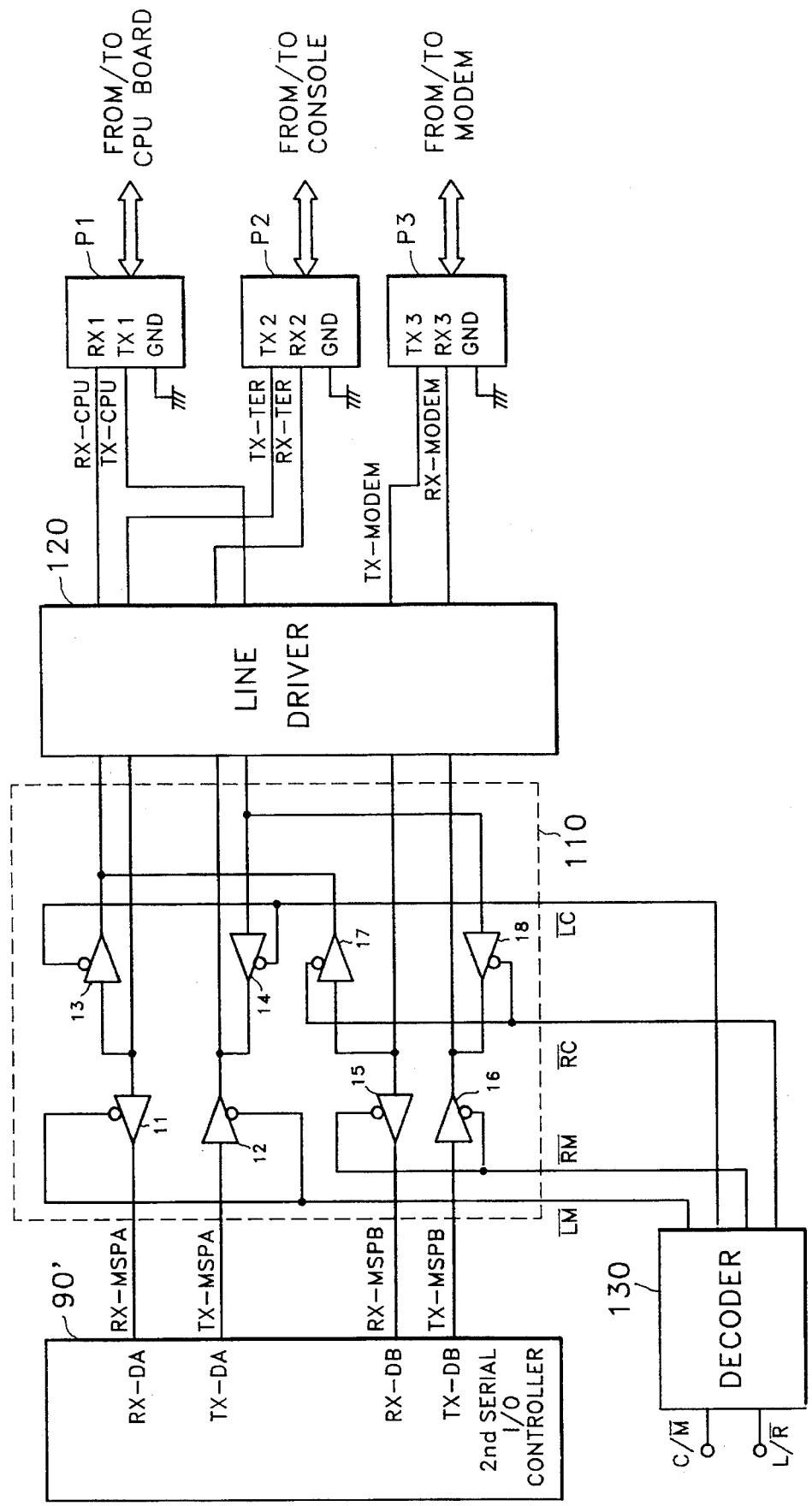
FIG. 4 is a circuit diagram of one embodiment of the system maintenance and support processor board included in FIG. 3.

FIG. 4 shows an embodiment of MSP board 40' adapted for the present invention.

Referring to FIG. 4, second serial I/O controller 90' in MSP board 40' is connected to a line driver 120 which is connected to first, second and third ports P1, P2 and P3 in MSP 40'.

A selective switching circuit 110 is positioned between second serial I/O controller 90' and line driver 120 and performs a switching operation in accordance with a control signal from a decoder 130.

Moreover, second serial I/O controller 90' has two pairs of terminals for receiving and transmitting data. A first terminal RX-DA is provided to receive a signal RX-MSPA from console 60, and a second terminal TX-DA is provided to transmit a signal TX-MSPA to console 60. Further, a third terminal RX-DB is provided to receive a signal RX-MSPB from modem 70 and a fourth terminal TX-DB is provided to transmit a signal TX-MSPB to modem 70.

On the other hand, first, second and third ports P1, P2 and P3 each have three terminals. First port P1 is provided with a first terminal RX1 for receiving a signal RX-CPU supplied to CPU board 30' and a second terminal TX1 for transmitting a signal TX-CPU from CPU board 30'. Second port P2 is provided with a first terminal RX2 for receiving a signal RX-TER supplied to console 60 and a second terminal TX2 for transmitting a signal TX-TER from console 60. Third port P3 is provided with a first terminal RX3 for receiving a signal RX-MODEM from modem 70 and a second terminal TX3 for transmitting a signal TX-MODEM. Here, the remaining third terminals (GND) of first, second and third ports P1, P2 and P3 are grounded.

The decoder 130 receives control signals C/$\overline{M}$ and L/$\overline{R}$ input by a user through an input device (not shown) to produce four switching control signals $\overline{LM}$, $\overline{LC}$, $\overline{RM}$ and $\overline{RC}$ which are each supplied to selective switching circuit 110.

First through eighth switches 11 to 18 form selective switching circuit 110. First switching control signal $\overline{LM}$ functions as a signal for controlling first and second switches 11 and 12, while second switching control signal $\overline{LC}$ functions as a signal for controlling third and fourth switches 13 and 14. Further, third switching control signal $\overline{RM}$ is a signal for controlling fifth and sixth switches 15 and 16, while fourth switching control signal $\overline{RC}$ is a signal for controlling seventh and eighth switches 17 and 18.

When first and second switches 11 and 12 are driven by receipt of first switching control signal $\overline{LM}$, transmitting signal TX-TER from console 60 via second port TX2 of second port P2 is transmitted to first switch 11 via line driver 120, and the output of first switch 11 is applied to first terminal RX-DA of second serial I/O controller 90', as receiving signal RX-MSPA of MSP board 40'. Transmitting signal TX-MSPA of MSP board 40' from second terminal TX-DA of second serial I/O controller 90' is transmitted to second switch 12 and the output of second switch 12 is, as supplying signal RX-TER to console 60, applied to first port RX2 of second port P2 via line driver 120.

When third and fourth switches 13 and 14 are driven by receipt of second switching control signal $\overline{LC}$, signal TX-TER from console 60 via second terminal TX2 of second port P2 is transmitted to third switch 13 via line driver 120, and the output of third switch 13 is, as receiving signal RX-CPU of CPU board 30', applied to first terminal RX1 of first port P1 via line driver 120.

Transmitting signal TX-CPU of CPU board 30' supplied from second terminal TX1 of first port P1 is transmitted to fourth switch 14 via line driver 120, and the output of fourth switch 14 is, as receiving signal RX-TER to console 60, applied to first terminal RX2 of second port P2 via line driver 120.

Further, when fifth and sixth switches 15 and 16 are driven by receipt of third switching control signal $\overline{RM}$, transmitting signal TX-MSPB of MSP board 40' supplied from fourth terminal TX-DB of second serial I/O controller 90' is fed to sixth switch 16 of which an output is, as receiving signal RX-MODEM of modem 70, applied to first terminal RX3 of third port P3 via line driver 120.

Signal TX-MODEM supplied from mode 70 via second terminal TX3 of third port P3 is supplied to fifth switch 15 via line driver 120, while the output of fifth switch 15 is, as receiving signal RX-MSPB of MSP board 40', applied to third terminal RX-DB of second serial I/O controller 90'.

Next, when seventh and eighth switches 17 and 18 are driven by receipt of fourth switching control signal $\overline{RC}$, transmitting signal TX-CPU of CPU board 30' supplied from second terminal TX1 of first port P1 is supplied through line driver 120 to eighth switch 8 of which an output is, as receiving signal RX-MODEM to modem 70, applied to first terminal RX3 of third port P3 via line driver 120. Transmitting signal TX-MODEM of modem 70 supplied from second terminal TX3 of third port P3 is supplied to seventh switch 17 via line driver 120, and the output of seventh switch 17 is, as receiving signal RX-CPU of CPU board 30', applied to first terminal RX1 of first port P1 via line driver 120.

Using a keyboard, a key-in operation performs user's desired-command among the four commands given in Table 1:

TABLE 1

| Command | Operation |
|---|---|
| LC | connection of the CPU board to the console |
| LM | connection of the MSP board to the console |
| RC | connection of the CPU board to the modem |
| RM | connection of the MSP board to the modem |

If MSP board 40' is connected to user-currently employing console 60, the key-in command is analyzed by MSP board 40', thereby performing the switching operation of first, second and third ports P1, P2 and P3 in MSP board 40'. However, when the current user-employed console 60 is connected to CPU board 30', CPU board 30' senses a key-in command and then transfers it to MSP board 40'. This action helps MSP board 40' perform the electrical switching operation of first, second and third ports P1, P2 and P3. MSP board 40' asserts control signals $C/\overline{M}$ and $L/\overline{R}$ in accordance with the key-in command. Control signals $C/\overline{M}$ and $L/\overline{R}$ are converted into switching control signals $\overline{LC}$, $\overline{LM}$, $\overline{RC}$, and $\overline{RM}$ by decoder 130.

Upon the receipt of control signals $C/\overline{M}$ and $L/\overline{R}$, decoder 130 produces switching control signals $\overline{LC}$, $\overline{LM}$, $\overline{RC}$, and $\overline{RM}$, which are given in Table 2 for logic combination generation thereof.

TABLE 2

| Control Signal | | Switching Control Signal | | | |
|---|---|---|---|---|---|
| $C/\overline{M}$ | $L/\overline{R}$ | $\overline{LC}$ | $\overline{RC}$ | $\overline{LM}$ | $\overline{RM}$ |
| L | L | H | H | H | L |
| L | H | H | H | L | H |
| H | L | H | L | H | H |
| H | H | L | H | H | H |

When an LC command is input, MSP board 40' produces a low level $\overline{LC}$ switching control signal which is applied to third and fourth switches 13 and 14 of selective switching circuit 110, so that both switches 13 and 14 are enabled and the remaining switches, i.e., first, second and fifth through eighth switches 11, 12, 15, 16, 17 and 18 are disabled. Accordingly, first port P1 is electrically connected to second port P2 and this connection allows CPU board 30' to communicate with console 60.

When an LM command is input, MSP board 40' produces a low level $\overline{LM}$ switching control signal which is applied to first and second switches 11 and 12 of selective switching circuit 110, thereby both switches 11 and 12 are enabled and the remaining switches, i.e., third through eighth switches 13–18, are disabled. Accordingly, second serial I/O controller 90' of MSP board 40' is electrically connected to second port P2. This connection allows MSP board 40' to communicate with console 60.

When an RM command is input, MSP board 40' produces a low level $\overline{RM}$ switching control signal which is applied to fifth and sixth switches 15 and 16 of selective switching circuit 110, so that both switches 15 and 16 are enabled and the remaining ones, i.e., first through fourth, seventh and eighth switches 11–14, 17 and 18, are disabled. Therefore, second serial I/O controller 90' of MSP board 40' is electrically connected to third port P3, so that MSP board 40' may communicate with modem 70.

When an RC command is input, MSP board 40' produces a low level switching control signal $\overline{RC}$ which in turn is supplied to seventh and eighth switches 17 and 18 of selective switching circuit 110, so that switches 17 and 18 are enabled and those remaining, i.e., first through sixth switches 11–16, are disabled. Accordingly, first port P1 is electrically connected to third port P3. This connection allows CPU board 30' to communicate with modem 70.

Figure 5:
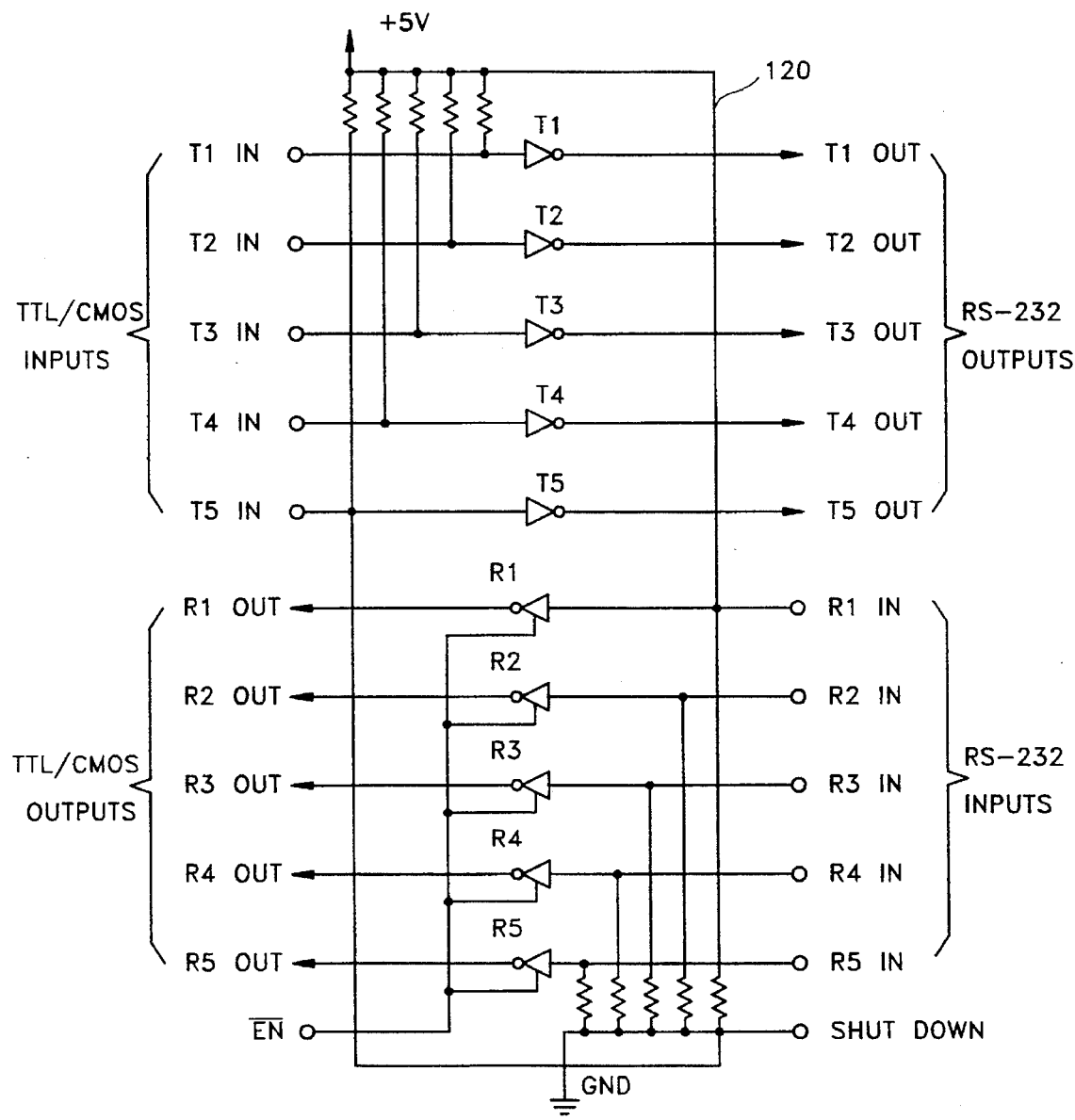
FIG. 5 is a view showing the construction of the RS-232C line driver of FIG. 4.

An embodiment of line driver 120 is shown in FIG. 5, which represents a detailed circuit of line driver 120.

According to the present invention, RS-232C drivers/receivers are, in this instance, used as line driver 120. As a standard interface, RS-232C drivers/receivers have such shortcomings as a low baud rate compared with parallel transfer because data is transferred serially, as well as one-to-one interface for terminal equipment interconnections, but have such advantages as wire arrangements, easy connection, and long distance-transfer.

The RS-232C interface is primarily to connect boards with data terminal equipment. In personal computers, the partial utilization of RS-232C standard specifications has simplified these connections.

A board for personal computer use cannot operate at 5 V because the minimum output voltage is ±5~±15 when loaded, when the connection between units is achieved for long periods of time by a cable. Therefore, a voltage higher than five volts produced from RS-232C interface is used as its internal power source, which is suited for standard specifications. That is, the RS-232C interface acts as an interface between a board for +5 volt use and a console or a modem for use at a predetermined voltage (±5 V~±15 V).

Figure 6:
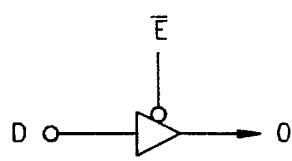
FIG. 6 is a view for illustrating the symbols in the selective switching circuit of FIG. 4.

FIG. 6 shows one bus buffer gate having three output states and used in selective switching circuit 110 of FIG. 4. The bus buffer gate operates as indicated in Table 3.

TABLE 3

| INPUTS | | |
|---|---|---|
| E | D | OUTPUT |
| L | L | L |
| L | H | H |
| H | X | Z |

Here, "H" indicates a logic high, "L" is a logic low, "X" designates a "don't care" condition, and "Z" means a high impedance. When a logic low is applied to an enable terminal $\overline{E}$, the input signal received at an input terminal D appears at output terminal O in the same logic state.

Figure 7:
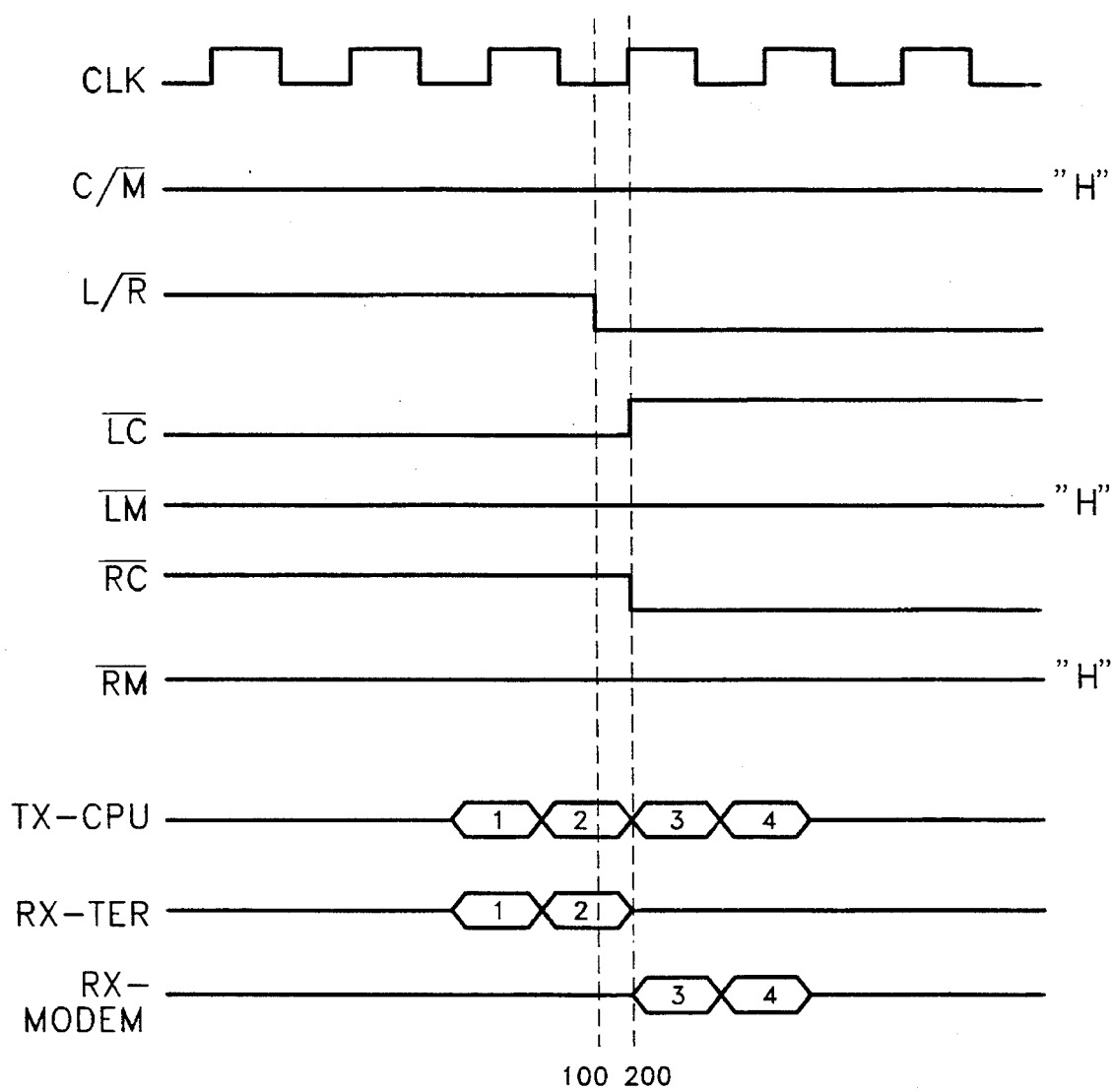
FIG. 7 is a waveform diagram showing a status when various logic control signals are input.

FIG. 7 shows various waveforms according to the present invention. When $C/\overline{M}$ and $L/\overline{R}$ control signals are both high, the $\overline{LC}$, $\overline{LM}$, $\overline{RC}$, and $\overline{RM}$ switching control signals are low, high, high, and high, respectively, thereby selecting the LC command. This selection enables CPU board 30' to be connected to console 60 resulting in receiving signal TX- CPU transmitted from CPU board 30', as receiving signal RX-TER of console 60.

When the C/$\overline{M}$ control signal is high and the L/$\overline{R}$ control signal is low, the $\overline{LC}$, $\overline{LM}$, $\overline{RC}$ and $\overline{RM}$ switching control signals are high, high, low, and high levels, respectively, thereby selecting the RC command. This selection enables CPU board 30' to be connected to modem 70. Accordingly, modem 70 receives transmitting signal TX-CPU of CPU board 30', as receiving signal RX-MODEM.

As a result, CPU transmitting signal TX-CPU is converted into console receiving signal RX-TER because transmitting signal TX-CPU of CPU board 30' is received at console 60, as indicated to the left of dotted line 100 of FIG. 7. On the right side of the dotted line 100, CPU transmitting signal TX-CPU is converted into mode receiving signal RX-MODEM because transmitting signal TX-CPU from CPU board 30' is received at modem 70. Here, the distance between the dotted lines 100 and 200 is synchronized by a clock signal.

In the system status maintaining and supporting apparatus of the present invention as described above, because two or more boards can interface with one console, ports included in center board (board connected to console) connected to other boards and ports can be switched with each other by command. In addition, the system status maintaining and supporting apparatus according to the present invention can monitor its status from a remotely controlled section without system bus utilization, because the user is able to access center boards as well as other boards connected to the center boards and ports, via a modem.

What is claimed is:

1. A computer system having a system status maintaining and supporting apparatus comprising:

a central processing unit board including a first internal serial input/output controller;

a console having a display;

first, second, and third data ports for transmitting and receiving electrical signals; and a maintenance and support processor board linked to said central processing unit board through a system bus and through separate signal lines, for monitoring the status of, processing, and displaying computer system errors without utilizing the system bus, said maintenance and support processor board including:

a second internal serial input/output controller having a plurality of transmit/receive terminals for transmitting and receiving electrical signals, a selective switching circuit having a plurality of switches, a decoder for receiving remote instruction signals and generating switching signals for said selective switching circuit so that selected switches electrically connect any two of said first, second, and third data ports, and line driver means comprising a plurality of line driver circuits, said central processing unit board being connected to said maintenance and support processor board through said first data port, said console being connected to said maintenance and support processor board through said second data port, said selective switching circuit being connected between said second internal input/output controller and said line driver means and connected to said decoder, said line driver means being connected between said selective switching circuit and said first, second, and third data ports, and said maintenance and support board being connected to a modem for remote communication through said third data port, said first data port, said second data port, said third data port and said first and second internal serial input/output controllers providing a link between said maintenance and support processor board, said central processing unit board said console and the modem via lines separate from the system bus.

2. The computer system of claim 1, wherein said plurality of line driver circuits comprise RS-232C interfaces.

3. The computer system of claim 1 wherein said first, second, and third data ports are three terminal grounded transmitting/receiving ports.

4. The computer system of claim 1 wherein said plurality of switches comprise bus buffer gates.

5. A system status maintaining and supporting apparatus comprising:

a maintenance and support board linked to a central processing unit through a system bus and through separate signal lines, for maintaining the status of, processing, and displaying central processing unit errors without utilizing the system bus, said maintenance and support board including an I/O controller having a plurality of input/output terminals for transmitting and receiving electrical signals;

first, second, and third ports for transmitting and receiving electrical signals;

a CPU board connected to said first port;

a switching circuit including a plurality of switches connected to said I/O controller;

a line driver connected between said first, second, and third ports and said switching circuit, said switching circuit selectively routing electrical signals between said plurality of terminals of said I/O controller and said first, second, and third ports; and a decoder for receiving remote instruction signals generating switching signals based on the remote instruction signals, and transmitting the switching signals to said switching circuit so that selected switches electrically connect any two of said first, second, and third ports, said first port providing a link between the central processing unit and said I/O controller, said second port providing link between said I/O controller and a console and said third port providing a link between said I/O controller and a remote terminal, said first port, said second port, said third port, and said I/O controller providing a link between said maintenance and support processor board, the central processing unit, the console the remote terminal via lines separate from the system bus.

6. The system status maintaining and supporting apparatus as claimed in claim 5 wherein said decoder generates and transmits switching signals to said switching circuit so that selected switches electrically connect said I/O controller with any one of said first, second, and third ports.

7. The system status maintaining and supporting apparatus as claimed in claim 6 wherein the console includes a display.

8. The system status maintaining and supporting apparatus as claimed in claim 6 further comprising a modem connected to said third port.

9. The system status maintaining and supporting apparatus as claimed in claim 7 wherein said maintenance and support board generates signals containing information indicative of system faults and transmits the signals to a display responsive to one of the switching signals.

10. A computer system comprising:

a console including a display;

a central processing unit; and a maintenance and support processor linked to said central processing unit through a system bus and through separate signal lines, for monitoring the status of, processing, and displaying computer system errors without utilizing the system bus, said maintenance and support processor having:

a serial input/output controller, a first port connected to said central processing unit, a second port connected to said console, a third port connected to a modem for communicating with a remote terminal, and selection control means for, in accordance with a control command, supplying a signal relating to system status from said central processing unit to said console via said second port, receiving and transmitting data between said central processing unit and said console via said first and second ports when said apparatus is in a mode used only for said central processing unit, and selectively connecting the modem to said central processing unit via said first and third ports and said maintenance and support processor via said third port when said apparatus is in a receiving/transmitting mode communicating with the terminal, said first port, said second port, said third port, and said serial input/output controller providing a link between said maintenance and support processor, said central processing unit, said console and said remote terminal via lines separate from the system bus.

11. The computer system as claimed in claim 10, wherein said maintenance and support processor further comprises:

decoding means for decoding the control command, and outputting logic control signals in response to a decoded control command; and a selection switching circuit for selectively controlling signal transmitting paths between said serial input/output controller and each of said first, second, and third ports in response to a logic control signal.

12. A system status maintaining and supporting apparatus comprising:

a maintenance and support processor, linked to a central processing unit through a system bus and through separate signal lines, for maintaining the status of, processing, and displaying central processing unit errors without utilizing the system bus;

an I/O controller having a plurality of input/output terminals for transmitting and receiving electrical signals;

first, second, and third ports for transmitting and receiving electrical signals, said first port providing a link between the central processing unit and said I/O controller, said second port providing a link between said I/O controller and a console, and said third port providing a link between said I/O controller and a remote terminal, said first port, said second port, said third port, and said I/O controller providing a link between said maintenance and support processor, the central processing unit, the console, and the remote terminal via lines separate from the system bus;

switching means for selectively routing electrical signals between said plurality of terminals of said I/O controller and said first, second, and third ports; and a decoder for receiving instruction signals and transmitting switching signals to said switching means so that said I/O controller is alternately connected to one of said first, second, and third ports.

13. The system status maintaining and supporting apparatus as claimed in claim 12 wherein said switching means comprises:

a switching circuit including a plurality of switches connected to said decoder and said I/O controller; and a line driver connected between said first, second, and third ports and said switching circuit.

14. The system status maintaining and supporting apparatus as claimed in claim 13 wherein said decoder generates and transmits switching signals to said switching circuit so that selected switches electrically connect any two of said first, second, and third ports.

15. The system status maintaining and supporting apparatus as claimed in claim 13 wherein said decoder generates and transmits switching signals to said switching circuit so that selected switches electrically connect said I/O controller with any one of said first, second, and third ports.

* * * * *

UNITED STATES PATENT AND TRADEMARK OFFICE
CERTIFICATE OF CORRECTION

PATENT NO. :  5,561,822
DATED      :  October 1, 1996
INVENTOR(S):  Ham

It is certified that error appears in the above-indentified patent and that said Letters Patent is hereby corrected as shown below: ON THE TITLE PAGE:

Item 73: Assignee; change "Kunggi-do" to --Kyunggi-do--;

Column 8, Line 7, after "1" delete --,--;

Line 42, after "providing" insert --a--.

Signed and Sealed this

Eighteenth Day of March, 1997

Attest:

BRUCE LEHMAN

*Attesting Officer*   Commissioner of Patents and Trademarks